United States Patent
Clemson

(10) Patent No.: US 10,503,782 B2
(45) Date of Patent: Dec. 10, 2019

(54) METAFUTURES-BASED GRAPHED DATA LOOKUP

(71) Applicant: TraceLink Inc., North Reading, MA (US)

(72) Inventor: Daniel Clemson, Pittsburgh, PA (US)

(73) Assignee: TRACELINK, INC., North Reading, MA (US)

( * ) Notice: Subject to any disclaimer, the term of this patent is extended or adjusted under 35 U.S.C. 154(b) by 259 days.

(21) Appl. No.: 15/462,845

(22) Filed: Mar. 18, 2017

(65) Prior Publication Data

US 2018/0268029 A1    Sep. 20, 2018

(51) Int. Cl.
*G06F 16/00*      (2019.01)
*G06F 16/901*     (2019.01)
*G06F 16/903*     (2019.01)
*G06F 16/33*      (2019.01)

(52) U.S. Cl.
CPC ...... *G06F 16/9024* (2019.01); *G06F 16/3349* (2019.01); *G06F 16/90344* (2019.01)

(58) Field of Classification Search
CPC .......... G06F 16/9024; G06F 16/90344; G06F 16/3349
See application file for complete search history.

*Primary Examiner* — Grace Park
(74) *Attorney, Agent, or Firm* — Steven M. Greenberg, Esq.; Shutts & Bowen LLP

(57) ABSTRACT

A computerized query optimization methodology, computer program product, and electronic device for intelligently optimizing the lookup of graphed data in a data store or distributed across a plurality of databases is disclosed. The method defines an initial metafuture including a plurality of attributes starting with initial data references to determine a starting list of data reference dependencies with respect to metafuture construction functions. In response to a query, a processor initiates a recursive graph traversal of nodes in a graph starting with the initial metafuture as a root node. At each step of the graph traversal, if the metafuture contains an answer, then the process traverses the graph laterally. If there are no further siblings, then the processor initiates a vertical traversal. If all of the children of the metafuture contain answers and the metafuture has no dependency tuples, then an answer of the metafuture is populated by running a graphing function with the answers of the children metafutures, and continuing the traversal either laterally, or vertically if there are no further siblings. If the metafuture is unvisited in the current traversal, then the process adds all not in-map data references in the work list to a needed list, and resolves all in-map data references to metafuture children while continuing the traversal down the graph. After the traversal, if the root metafuture contains an answer, the answer to the query is returned.

13 Claims, 9 Drawing Sheets

METAFUTURES-BASED GRAPHED DATA LOOKUP

FIELD OF THE DISCLOSURE

The present disclosure relates generally to a process for intelligently optimizing the lookup of graphed data contained within a data store.

BACKGROUND

When executing business logic in a computerized environment with respect to graphed data, i.e., hierarchical serial numbers, a large number of repeated queries may be needed to answer queries regarding the state and organization of such data. Depending upon the nature of the query and the state of the data, different optimization strategies may apply to the order of the query.

In order to optimize such queries, data from prior queries may be reused to avoid extraneous processing and lookups. It will be appreciated that lookups are most efficient when batched in groups as large as possible. The present disclosure provides an optimal methodology and computer program product for optimizing such lookups.

SUMMARY OF THE DISCLOSURE

In accordance with aspects of the disclosure, there is provided a computerized query optimization strategy for intelligently optimizing the lookup of graphed data in a data store or data stored in a plurality of distributed databases. By way of example and without limitation, the graph may be implemented in the form of a tree structure, or the graph could represent a plurality of nodes in a social network.

In accordance with a first aspect of the disclosure, there is provided a method of intelligently optimizing the lookup of graphed data contained within a data store. The method initially defines, via a computer processor, an initial metafuture including a plurality of attributes starting with initial data references to determine a starting list of data reference dependencies with respect to metafuture construction functions. In response to a query, the processor initiates a recursive graph traversal of nodes in a graph starting with the initial metafuture as a root node. At each step of the graph traversal, if the metafuture contains an answer, then the process traverses the graph laterally. If there are no further siblings, then the processor initiates a vertical traversal. If all of the children of the metafuture contain answers and the metafuture has no dependency tuples, then an answer of the metafuture is populated by running an aggregation function with the answers of the children metafutures, and continuing the traversal either laterally, or vertically if there are no further siblings. If the metafuture is unvisited in the current traversal, then the process adds all not in-map data references in the work list to a needed list, and resolves all in-map data references to metafuture children while continuing the traversal down the graph. After the traversal, if the root metafuture contains an answer, the answer to the query is returned. The procedure may then be repeated.

In accordance with a further aspect of the disclosure, there is provided a computer program product including machine usable program instructions stored in a non-transitory memory that may be executed by a computer processor for intelligently optimizing the lookup of graphed data contained within a data store via the methodology described above.

In accordance with yet another aspect of the disclosure, there is provided an electronic device including a computer processor and memory as described above for intelligently optimizing the lookup of graphed data contained within a data store.

These and additional aspects and advantages will become apparent hereinafter to those of ordinary skill in the art as the disclosure is described in detail with particular reference to the accompanying drawings.

DETAILED DESCRIPTION OF THE PREFERRED EMBODIMENTS

Figure 1:
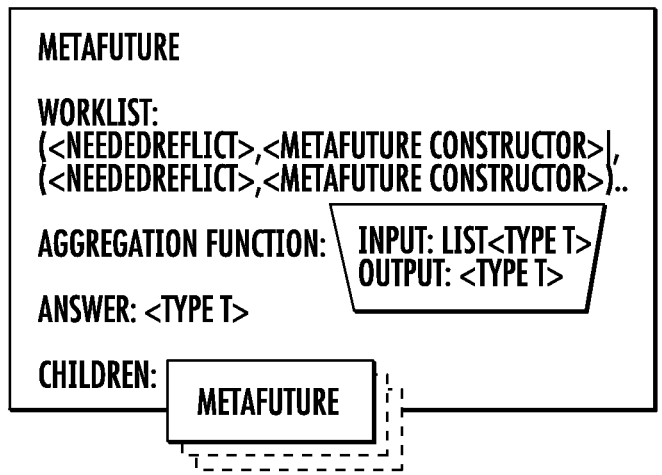
FIG. 1 is a pictorial representation of an illustrative metafuture in accordance with an aspect of the disclosure.

As will be appreciated by those skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference to the several figures of the drawings starting with FIG. 1, the inventive process defines an object called a 'metafuture'. A metafuture contains the following attributes:

Some number (that may be 0) of metafuture children

A work list, which is a given number (again, that may be 0) of tuples of lists of data references and functions that expect a list of data elements and return a metafuture. The lists of data references identify which data elements need to be retrieved in order to run a matching function to generate a child metafuture. At a given point, the constructed metafuture is constructed with an empty work list and a populate answer.

An aggregation function that returns an answer of a desired type from a list of elements of the desired type.

A potential answer of the desired type; this variable is generally initialized as empty.

Figure 2:
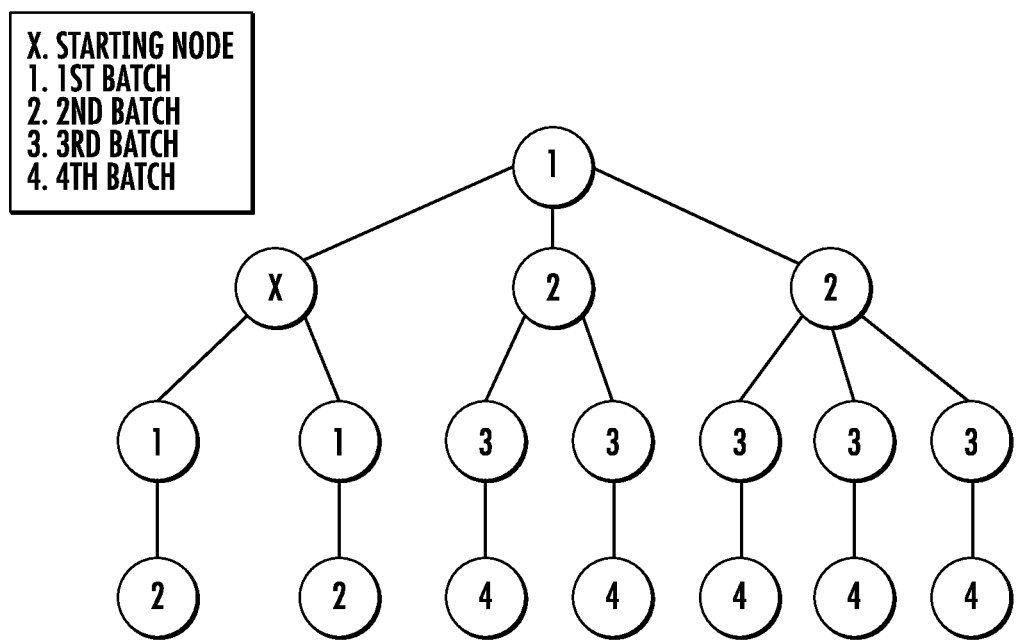
FIG. 2 is a schematic of a graph of nodes in a data structure in accordance with an aspect of the disclosure.

In accordance with aspects of the disclosure, a solution is found by creating a map of data references to data as shown generally in FIG. 2, a list of data references (initially empty) to retrieve the data elements for, and by phrasing the questions we wish to answer about our data as a single question of arbitrary complexity (meaning, if we want to answer two questions about our data, we instead set up the problem as one question that returns a multi-part answer of part A and part B). There is also a necessary provided list of starting data references from which to start our initial lookups.

Next, so as to obtain an answer with optimum efficiency, an initial metafuture is constructed starting with initial data references to determine the starting list of data reference dependencies with respect to metafuture construction functions. Next, a repeated graph traversal is initiated with this metafuture as the root node. At every step of the graph traversal:

1. If the metafuture contains its answer, traverse right (or up if no further siblings).
2. If all of the children of the metafuture contain their answers and the metafuture has no dependency tuples, populate the answer of the metafuture by running the aggregation function with the answers of the children Metafutures, and continue traversal right (or up if no further siblings)
3. If the metafuture is unvisited this traversal:
   i. Add all not in-map data references in work list to needed list
   ii. Resolve all in-map data references to metafuture children c. Continue traversal down the graph.

After the traversal:
1. If the root metafuture contains an answer, return the answer, the algorithm is done.
2. Fetch all needed elements in a single batch call; and
3. Repeat the steps in the algorithm.

In this manner, batch calls are maximized to the greatest extent, while at the same time, re-traversals of the graph for already ascertained data is minimized as much as possible.

Figure 3:
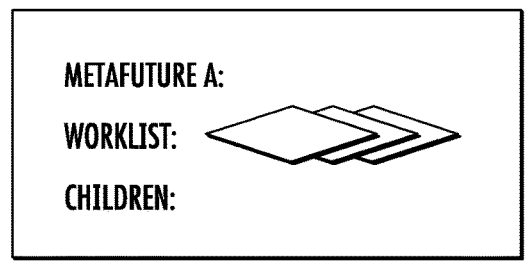
FIG. 3 is a representation of an initial root node "metafuture A"

In this regard, the following describes an exemplary application in accordance with aspects of the present disclosure as pictorially represented in FIGS. 3 through 22. Referring now to FIG. 3, there is shown an initial root metafuture (A) including a work list and no children, an initial map of data references to empty data, and an empty initial needed list that is empty. The work list contains a set of elements for the given set of container items, and is utilized to construct Metafutures when the data is present in the map.

Reference Map: [Empty]
Needed List: [Empty]

The process next proceeds by visiting node A in the graph, and adding all of the needed data references to the list of needed elements:

Reference Map: [Empty]
Needed List: [Needed B ref, Needed C ref, Needed D ref]

Next, after the graph traversal is complete, all of the elements referenced in the graph traversal are fetched in the list in a single batch call:

Reference Map:
  B ref->B Element
  C ref->C Element
  D ref->D Element
Needed List: [empty]

Figure 4:
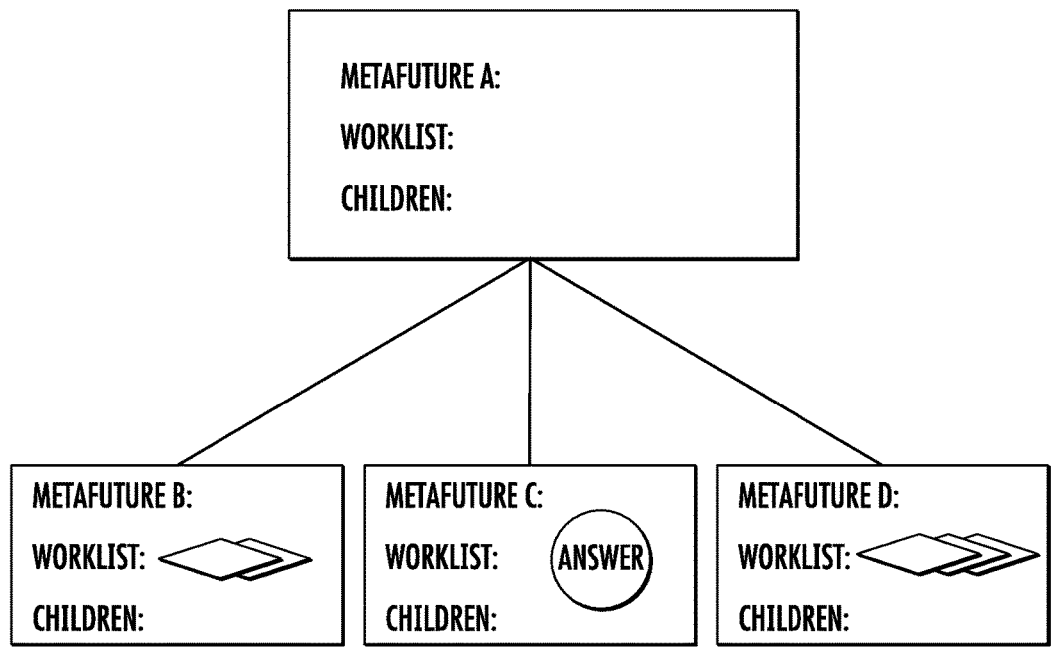
FIG. 4 is a representation of the process restarting the graph traversal by visiting metafuture node A, traversing the graph through the work list, and constructing metafuture nodes B, C and D.

The process proceeds as shown in FIG. 4, where traversal of the graph is repeated from the root node A, and thereafter traverses through the work list, thereby constructing a metafuture (B,C, and D) for each work list item, such that the data elements are obtained for all, in this exemplary case:

Reference Map:
  B ref->B Element
  C ref->C Element
  D ref->D Element
Needed List: [Empty]

Figure 5:
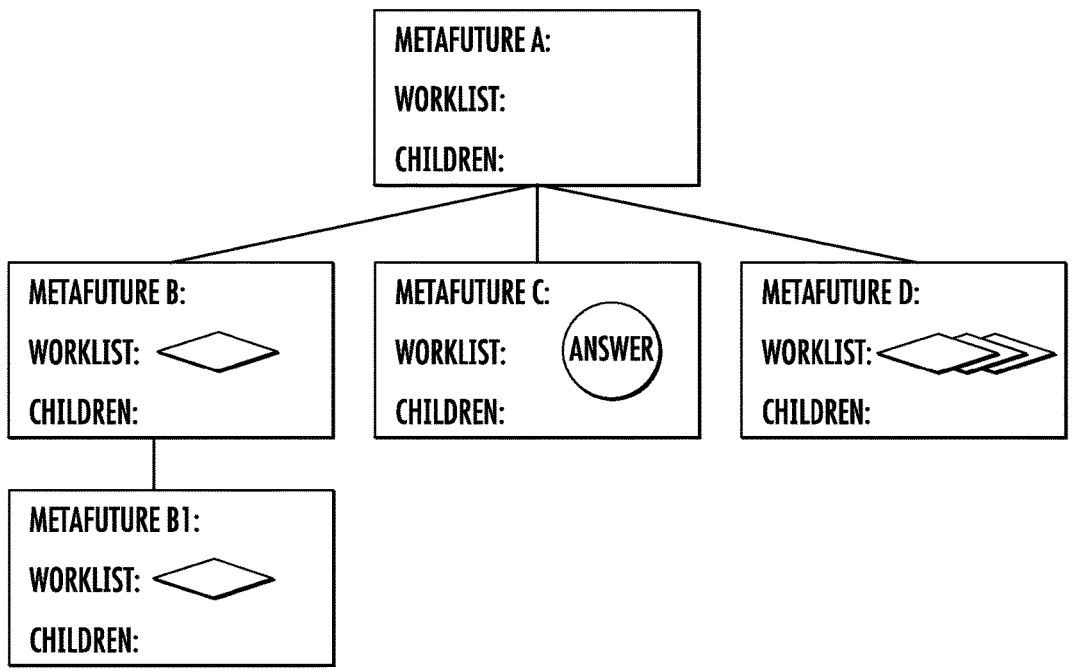
FIG. 5 is a representation of the process continuing the traversal to node B, adding needed data references to the list, and creating metafutures for data references that were already obtained.

Next, as depicted pictorially in FIG. 5, the traversal continues to node B, and the needed data references are added to the needed list. Metafutures are then created for data references that are previously ascertained. In this example B1 only requires data that was already in the reference map, such as, for example, "C Element":

Reference Map:
  B ref->B Element
  C ref->C Element
  D ref->D Element
Needed List: [Needed B2 ref]

The process then traverses the graph to node B1, and adds needed data references to the needed list:

Reference Map:
  B ref->B Element,
  C ref->C Element
  D ref->D Element
Needed List: [Needed B2 ref, Needed B1a ref]

Next, the traversal is resumed and proceeds back to node B. If it is determined that not every child node has an answer and the children were already visited during the course of this traversal, the traversal then continues to node C. If it has an answer, then the traversal continues to node D, and its needed data references are added to the needed list:

Reference Map:
  B ref->B Element
  C ref->C Element
  D ref->D Element
Needed List: [Needed B2 ref, Needed B1a ref, Needed D1 ref, Needed D2 ref, Needed D3 ref]

If the traversal through A fails to reveal an answer for all the children of A, then this traversal is finished and terminated. The process then proceeds to fetch all of the elements referenced in the needed list in a single batch call:

Reference Map:
  B ref->B Element,
  B1a ref->B1a Element
  B2 ref->B2 Element
  C ref->C Element
  D ref->D Element
  D1 ref->D1 Element
  D2 ref->D2 Element
  D3 ref->D3 Element
Needed List: [Empty]

Figure 6:
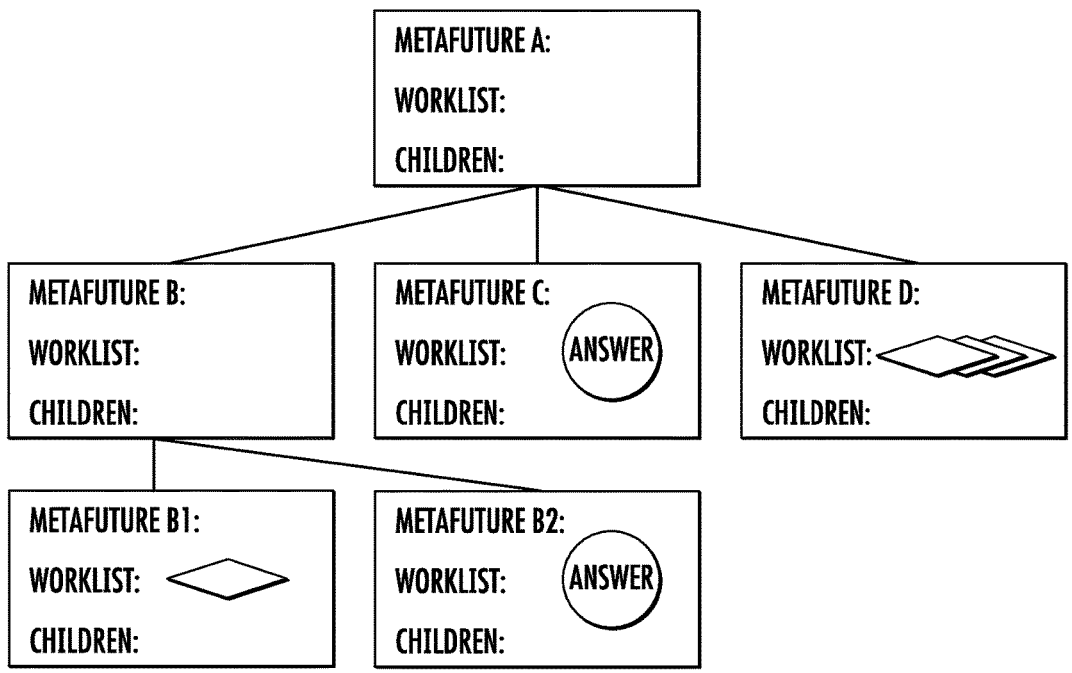
FIG. 6 is a representation of the process restarting the graph traversal at node A, continuing the traversal through node A's children, visiting node B to find the elements present in the map to satisfy the work list items, and constructing metafuture node B2.

As shown in FIG. 6, the process restarts the graph traversal. In this connection, the process visits the first node—A. If it has no answer and it's children do not all contain answers and it has no work list items, then continue the traversal through the children of Node A. The process moves to Node B, to determine that the elements are present in the map to satisfy Node B's work list items, and from this, metafuture B2 is created:

Reference Map:
  B ref->B Element
  B1a ref->B1a Element
  B2 ref->B2 Element
  C ref->C Element
  D ref->D Element
  D1 ref->D1 Element
  D2 ref->D2 Element
  D3 ref->D3 Element
Needed List: [Empty]

Figure 7:
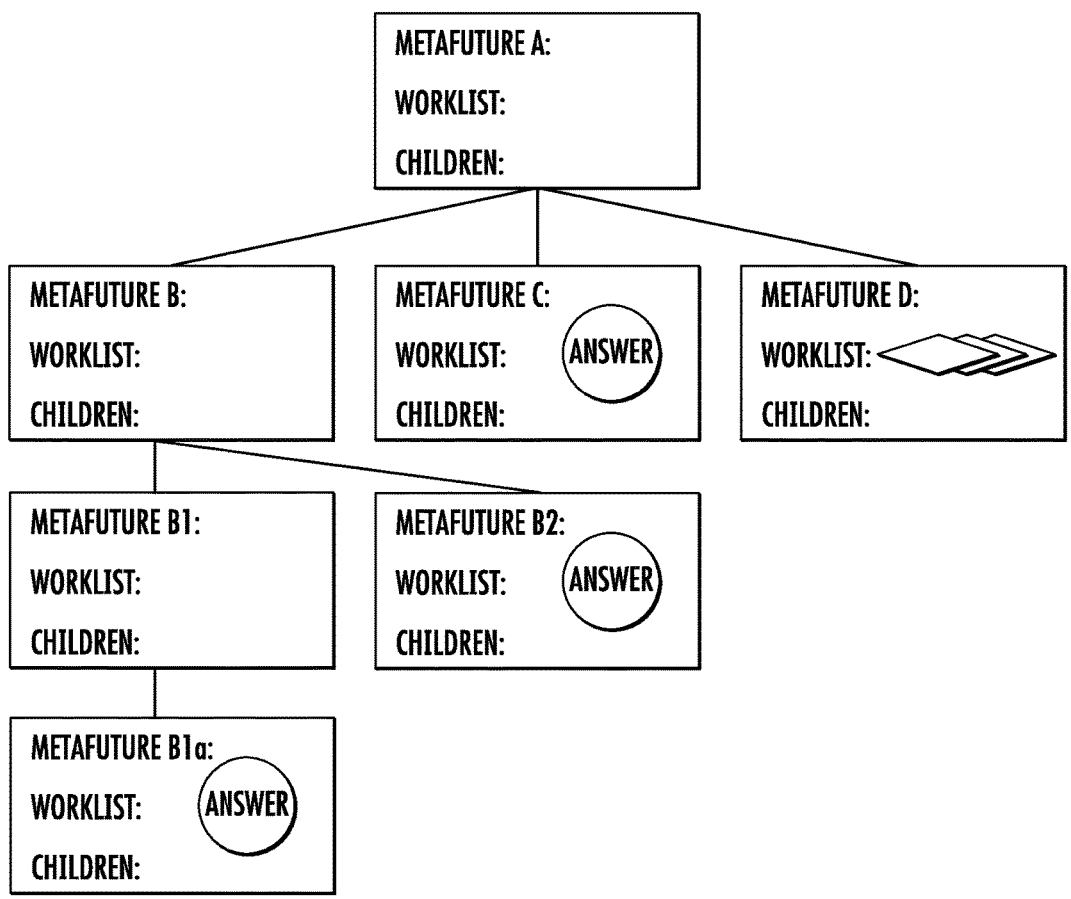
FIG. 7 is a representation of the next step in the process where the node B1 has references necessary to satisfy its lookup node—B1$a$.

The next traversal point is B1, which also has the refs necessary to satisfy its lookup (B1a) as shown in FIG. 7:

Reference Map:
  B ref->B Element
  B1a ref->B1a Element
  B2 ref->B2 Element,
  C ref->C Element
  D ref->D Element
  D1 ref->D1 Element
  D2 ref->D2 Element
  D3 ref->D3 Element
Needed List: [Empty]

Figure 8:
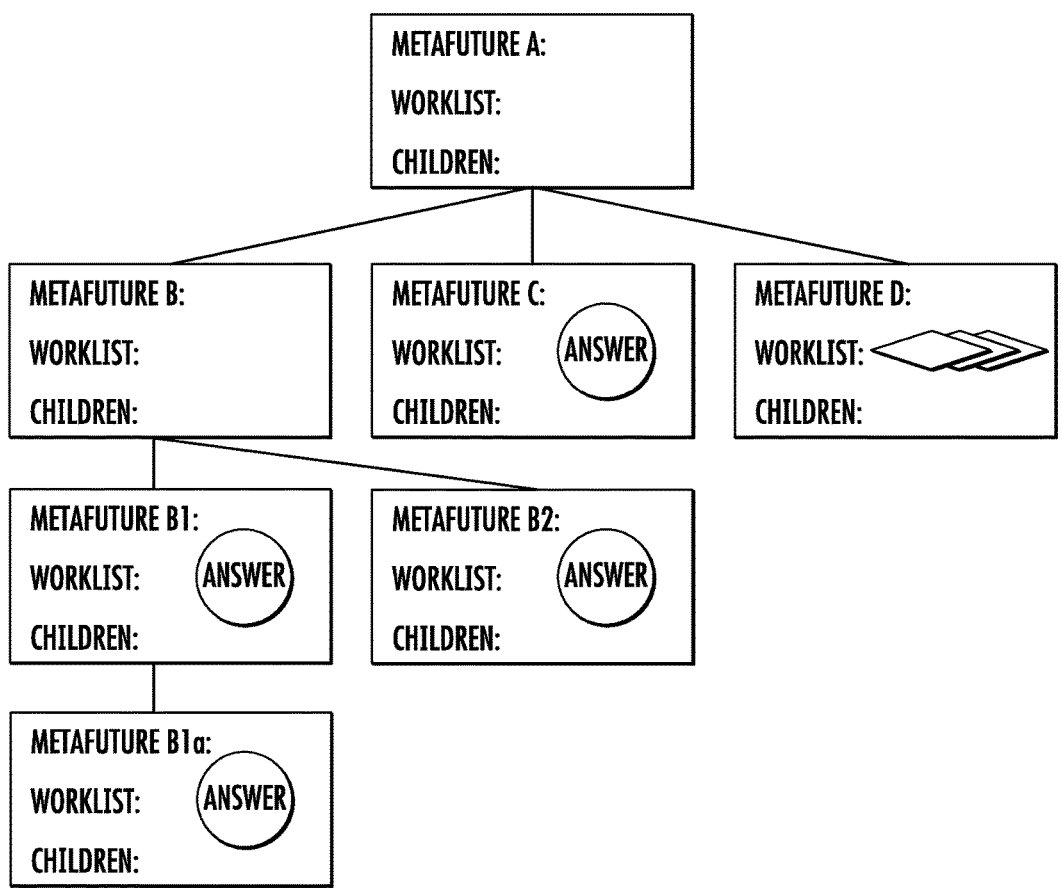
FIG. 8 is a representation of the next step in the process where node B1$a$ returns an answer, proceeds to check whether all of its children have an answer and runs an aggregation function over the answers to populate its own answer.

Referring to FIG. 8, the traversal proceeds to examine node B1a, determines whether it has an answer to the query, and returns to node B1. If all B1's children have an answer, an aggregation function is run over the answers of its children to populate its own answer.

Reference Map:
  B ref->B Element
  B1a ref->B1a Element

B2 ref->B2 Element
C ref->C Element
D2 ref->D2 Element
D ref->D Element
D1 ref->D1 Element
D3 ref->D3 Element
Needed List: [Empty]

Figure 9:
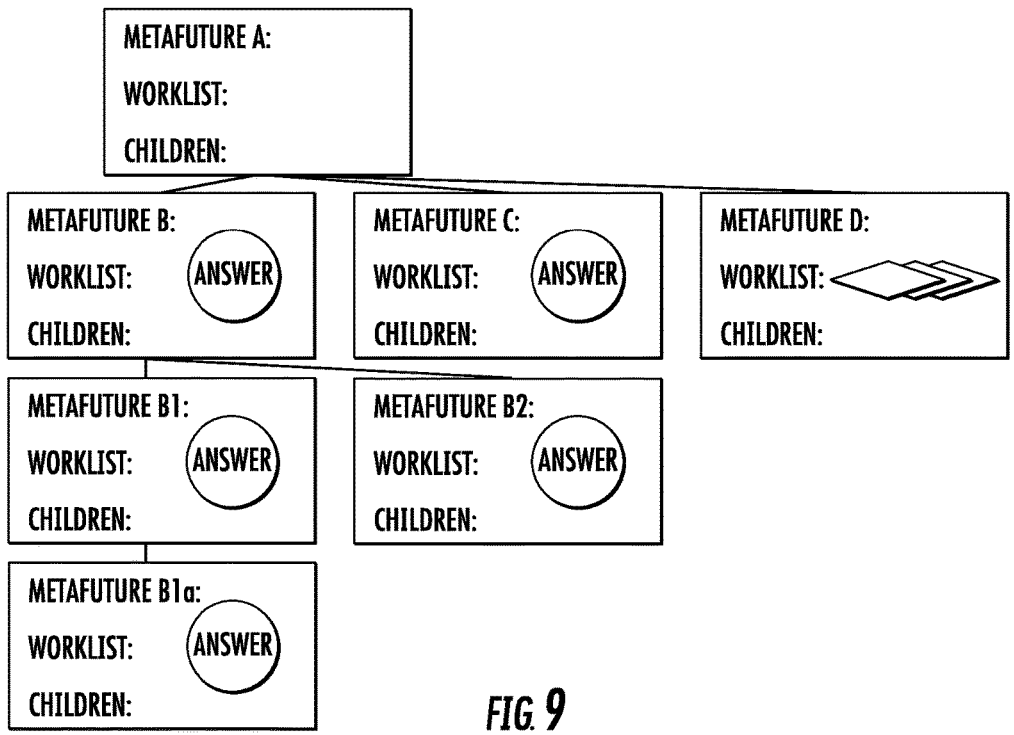
FIG. 9 is a representation of node B2 returning an answer, and running an aggregation function over the answers of its children.

With reference to FIG. 9, similarly, node B2 returns an answer up through the chain, and then B runs the aggregation over the answers of its children since they have all been completed.

Reference Map:
B ref->B Element
B1*a* ref->B1*a* Element, B2 ref->B2 Element,
C ref->C Element
D ref->D Element
D1 ref->D1 Element
D2 ref->D2 Element
D3 ref->D3 Element
Needed List: [Empty]

Figure 10:
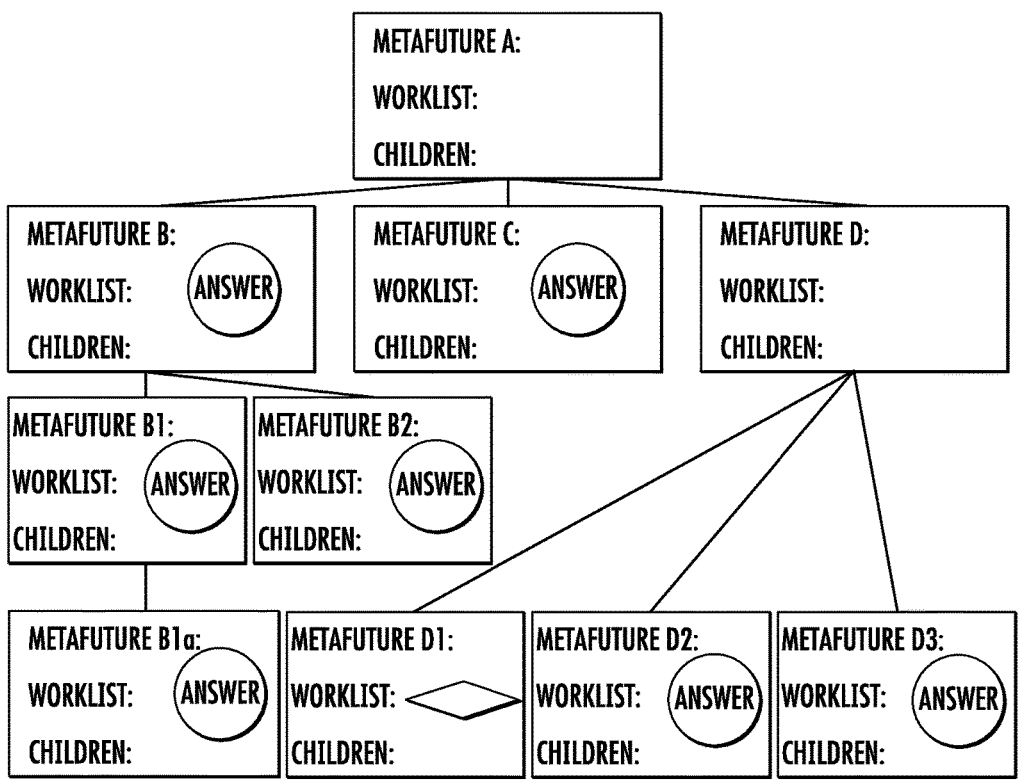
FIG. 10 is a depiction of the next step in the traversal after nodes B and C, which proceeds to metafuture node D and it children.

As shown in FIG. 10, after traversing nodes B and C, the process proceeds to node D, which has elements needed to construct the children of node D.

Reference Map:
B ref->B Element,
B1*a* ref->B1*a* Element
B2 ref->B2 Element
C ref->C Element
D ref->D Element
D1 ref->D1 Element
D2 ref->D2 Element
D3 ref->D3 Element
Needed List: [Empty]

Next, the process proceeds down the graph to node D1, and adds the needed refs to the Needed list.

Reference Map:
B ref->B Element,
B1*a* ref->B1*a* Element
B2 ref->B2 Element,
C ref->C Element
D ref->D Element,
D1 ref->D1 Element
D2 ref->D2 Element
D3 ref->D3 Element
Needed List: [Needed D1*a* ref]

The process proceeds through nodes D2, D3, D, and A, without implementing any examination, to complete this traversal. It then fetches all of the elements in the needed list in a single batch call.

Reference Map:
B ref->B Element,
B1*a* ref->B1*a* Element
B2 ref->B2 Element
C ref->C Element
D ref->D Element
D1 ref->D1 Element
D1*a* ref->D1*a* Element
D2 ref->D2 Element
D3 ref->D3 Element
Needed List: [Empty]

Figure 11:
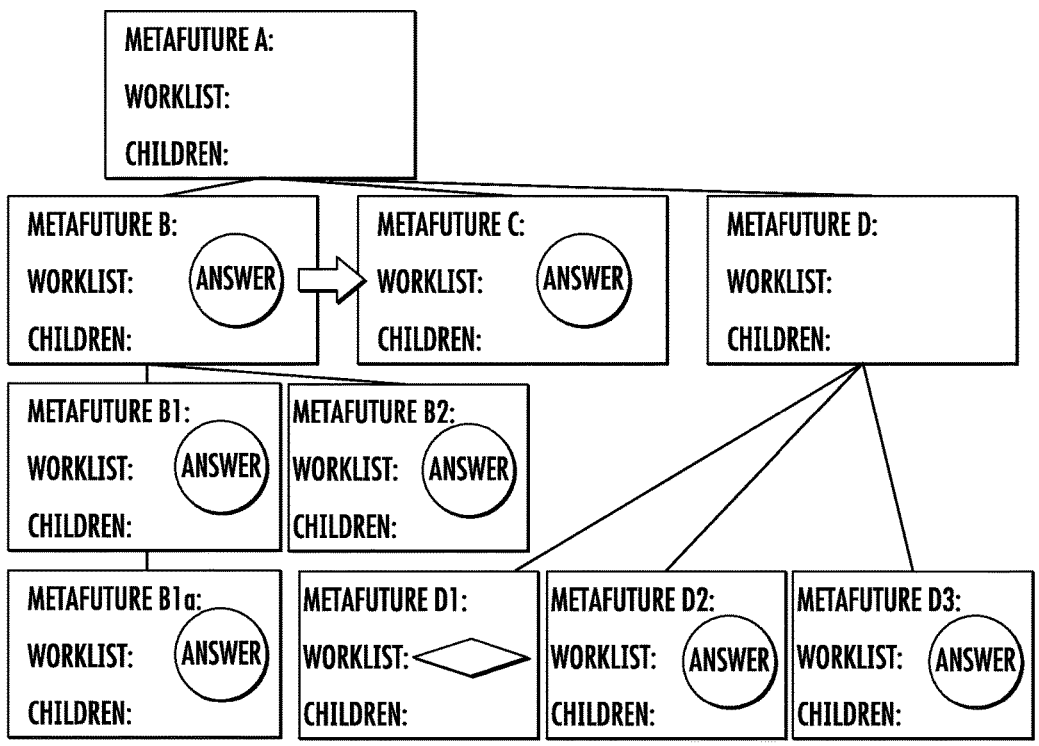
FIG. 11 is a depiction of the traversal restarting and proceeding from node A to node B, and after determining that B already has an answer, then proceeding to node C.

Thereafter, as shown in FIG. 11 the traversal restarts by proceeding from metafuture A to metafuture B. If it is determined that node B already has an answer, the process proceeds to node C.

Reference Map:
B ref->B Element
B1*a* ref->B1*a* Element
B2 ref->B2 Element
C ref->C Element
D ref->D Element
D1 ref->D1 Element
D1*a* ref->D1*a* Element
D2 ref->D2 Element
D3 ref->D3 Element
Needed List: [Empty]

Figure 12:
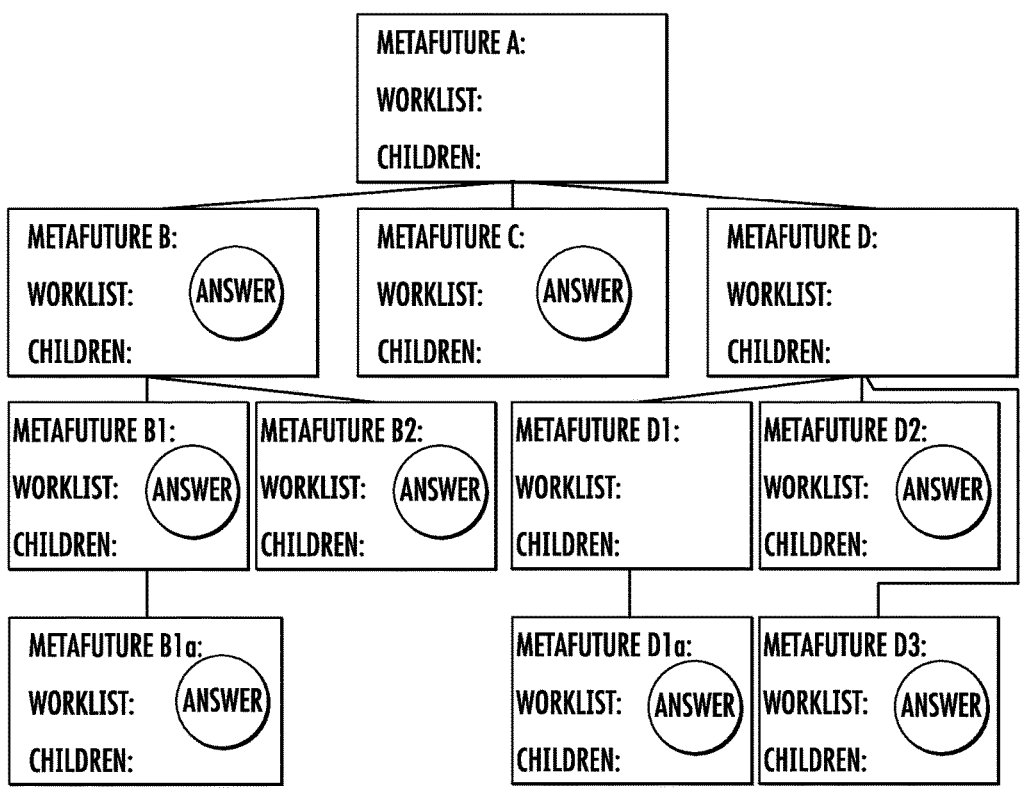
FIG. 12 is a representation of the traversal proceeding to node D, and then D1, and thereafter to construct D1$a$.

With reference to FIG. 12, the traversal proceeds to nodes D and D1, to enable a construct of D1*a*.

Reference Map:
B ref->B Element
B1*a* ref->B1*a* Element
B2 ref->B2 Element
C ref->C Element
D ref->D Element
D1 ref->D1 Element
D1*a* ref->D1*a* Element
D2 ref->D2 Element
D3 ref->D3 Element
Needed List: [Empty]

Figure 13:
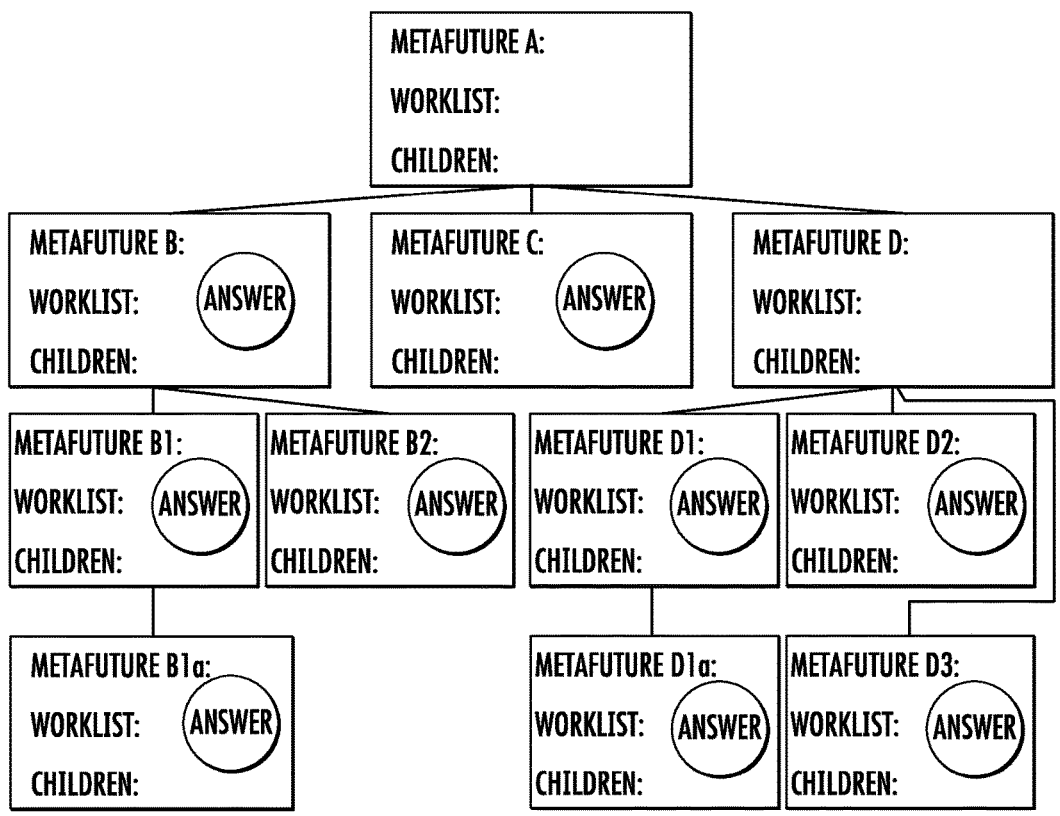
FIG. 13 is a depiction of the traversal returning to node D1, determining that all of its children have answers, and aggregating an answer for D1.

Next, with reference to FIG. 13, the traversal returns to node D1, to determine if all of its children have answers, and to then aggregate an answer for it.

Reference Map:
B ref->B Element
B1*a* ref->B1*a* Element
B2 ref->B2 Element
C ref->C Element
D ref->D Element
D1 ref->D1 Element
D1*a* ref->D1*a* Element
D2 ref->D2 Element
D3 ref->D3 Element
Needed List: [Empty]

Figure 14:
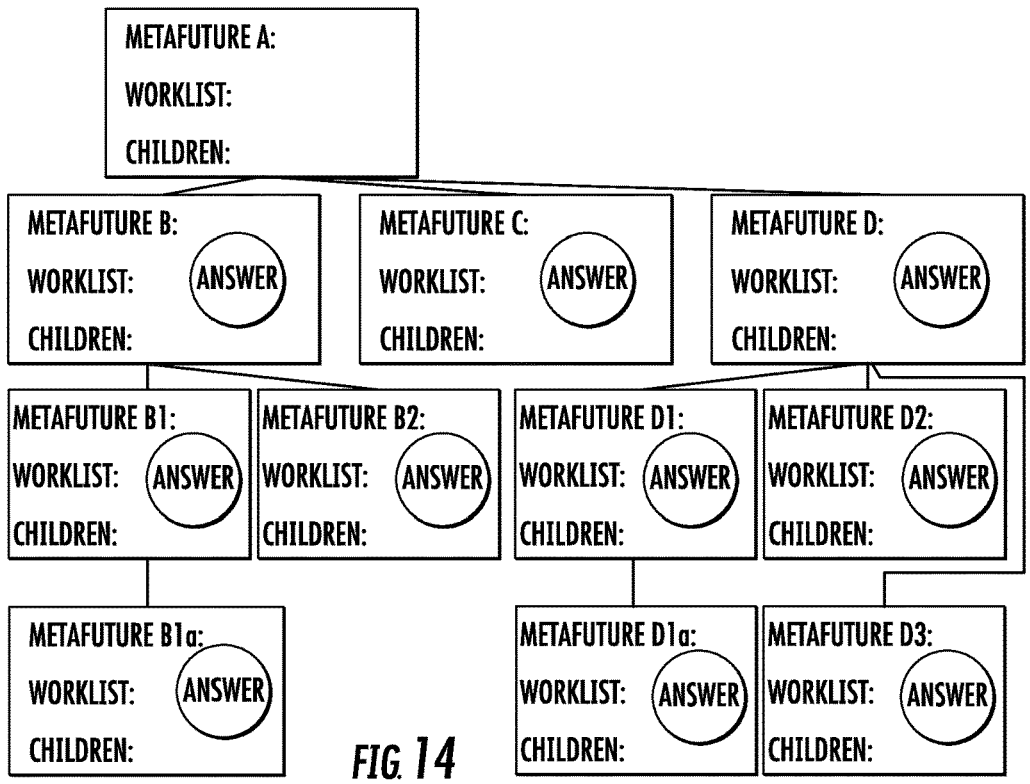
FIG. 14 is an illustration of the traversal proceeding through nodes D2, D3 and then up to D, determining that all children have answers, and aggregating an answer.

In the next step depicted in FIG. 14, the traversal proceeds through D2, D3, then up to D, the process determines if all of its children have answers, and then an answer is graphed for it as follows.

Reference Map:
B ref->B Element
B1*a* ref->B1*a* Element
B2 ref->B2 Element
C ref->C Element
D ref->D Element
D1 ref->D1 Element
D1*a* ref->D1*a* Element
D2 ref->D2 Element
D3 ref->D3 Element
Needed List: [Empty]

Figure 15:
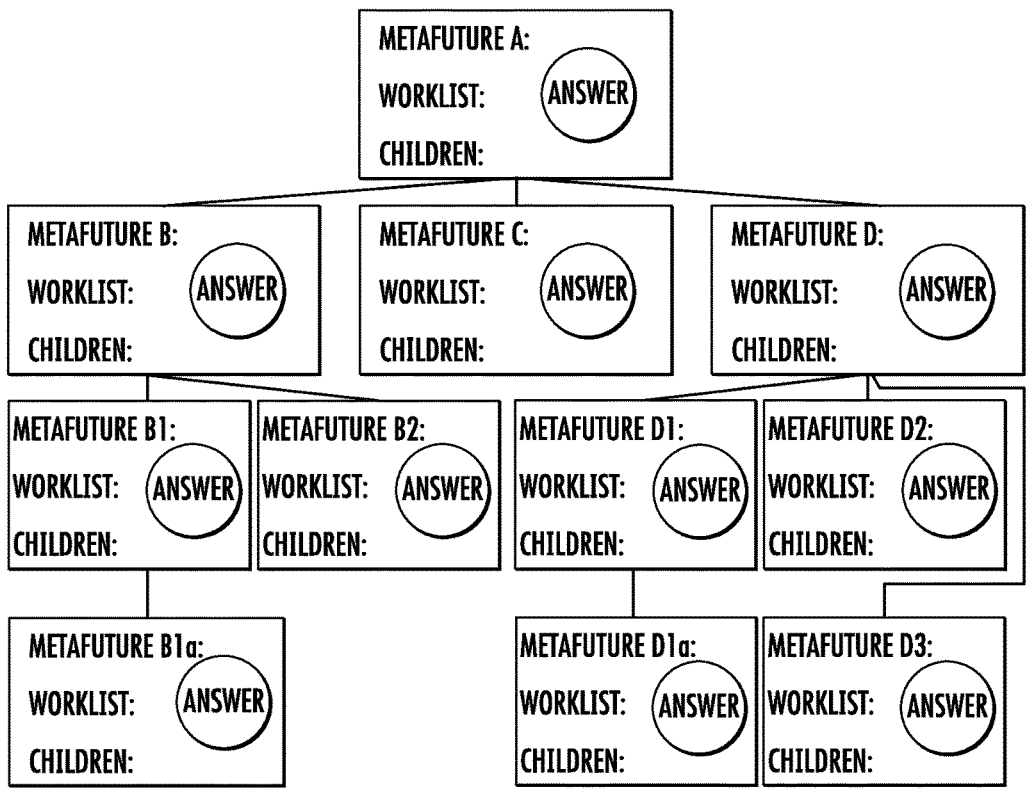
FIG. 15 is the final step wherein the traversal proceeds to node A, determines that all of node A's children have an answer, and aggregates an answer that is returned to the query as the final answer.

Finally, as shown in FIG. 15, the process proceeds up to A, determines if all of its children have an answer, and aggregates an answer to the root node. Since node A is the root, this answer is returned as the final answer.

Reference Map:
B ref->B Element
B1*a* ref->B1*a* Element
B2 ref->B2 Element
C ref->C Element
D ref->D Element
D1 ref->D1 Element
D1*a* ref->D1*a* Element
D2 ref->D2 Element
D3 ref->D3 Element
Needed List: [Empty]

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may be out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present disclosure has been shown and described in what are considered to be the most practical and preferred embodiments. It is anticipated, however, that departures may be made therefrom and that obvious modifications will be implemented by those skilled in the art.

I claim:

1. A method of intelligently optimizing the lookup of graphed data contained within a data store, comprising the steps of:
   defining, via a computer processor, an initial metafuture including a plurality of attributes starting with initial data references to determine a starting list of data reference dependencies with respect to metafuture construction functions;
   in response to a query, initiating a recursive graph traversal of nodes in a graph starting with the initial metafuture as a root node; and
   at each step of the graph traversal:
      in response to determining that the metafuture contains an answer, traversing the graph laterally, or vertically if there are no further siblings;
      in response to determining that all of the children of the metafuture contain answers and the metafuture has no dependency tuples, populating the answer of the metafuture by running an aggregation function with the answers of the children Metafutures, and continuing the traversal laterally, or vertically if there are no further siblings;
      in response to determining that the metafuture is unvisited in the traversal:
         adding all not in-map data references in the work list to a needed list;
         resolving all in-map data references to metafuture children and continuing the traversal down the graph; and
         after the traversal:
            in response to determining that the root metafuture contains an answer, returning the answer to the query.

2. The method of claim 1, further comprising fetching all needed elements in a single batch call, and repeating the graph traversals.

3. The method of claim 1, further comprising creating a map of data references to data, an initially empty list of data references to retrieve data elements, and phrasing data queries as a single question of arbitrary complexity.

4. The method of claim 1, wherein a metafuture comprises attributes including:
   a number of metafuture children;
   a work list comprising a given number of tuples of lists of data references and functions that expect a list of data elements and return a metafuture, the lists of data references identifying data elements to be retrieved in order to run a matching function to generate a child metafuture, where the metafuture is constructed with an empty work list and a populated answer;
   a graph function that returns an answer of a desired type from a list of elements of the desired type; and
   a potential answer of the desired type.

5. A computer program product comprising a non-transitory medium containing computer usable program instructions for intelligently optimizing the lookup of graphed data contained within a data store, comprising:
   computer usable program instructions, which when executed by a processor, define an initial metafuture including a plurality of attributes starting with initial data references to determine a starting list of data reference dependencies with respect to metafuture construction functions;
   in response to a query, the computer usable program instructions, which when executed by a processor, initiating a recursive graph traversal of nodes in a graph starting with the initial metafuture as a root node; and
   at each step of the graph traversal:
      in response to determining that the metafuture contains an answer, traversing the graph laterally, or vertically if there are no further siblings;
      in response to determining that all of the children of the metafuture contain answers and the metafuture has no dependency tuples, populating the answer of the metafuture by running a graphing function with the answers of the children Metafutures, and continuing the traversal laterally, or vertically if there are no further siblings;
      in response to determining that the metafuture is unvisited in the traversal:
         adding all not in-map data references in the work list to a needed list;
         resolving all in-map data references to metafuture children and continuing the traversal down the graph; and
         after the traversal:
            in response to determining that the root metafuture contains an answer, returning the answer to the query.

6. The computer program product of claim 5, further comprising computer usable program instructions for fetching all needed elements in a single batch call, and repeating the graph traversals.

7. The computer program product of claim 5, further comprising further comprising computer usable program instructions for creating a map of data references to data and an initially empty list of data references to retrieve data elements, and phrasing data queries as a single question of arbitrary complexity.

8. The computer program product of claim 5, wherein a metafuture comprises attributes including:
   a number of metafuture children;
   a work list comprising a given number of tuples of lists of data references and functions that expect a list of data elements and return a metafuture, the lists of data references identifying data elements to be retrieved in order to run a matching function to generate a child metafuture, where the metafuture is constructed with an empty work list and a populated answer;

a graph function that returns an answer of a desired type from a list of elements of the desired type; and a potential answer of the desired type.

9. An electronic device comprising:

a computer processor and a non-transitory medium containing computer usable program instructions for intelligently optimizing the lookup of graphed data contained within a data store;

the computer usable program instructions, which when executed by the computer processor, define an initial metafuture including a plurality of attributes starting with initial data references to determine a starting list of data reference dependencies with respect to metafuture construction functions;

in response to a query, the computer usable program instructions, which when executed by the processor, initiating a repeated graph traversal of nodes in a graph starting with the initial metafuture as a root node; and at each step of the graph traversal:
- in response to determining that the metafuture contains an answer, traversing the graph laterally, or vertically if there are no further siblings;
- in response to determining that all of the children of the metafuture contain answers and the metafuture has no dependency tuples, populating the answer of the metafuture by running a graph function with the answers of the children Metafutures, and continuing the traversal laterally, or vertically if there are no further siblings;
- in response to determining that the metafuture is unvisited in the traversal:
  - adding all not in-map data references in the work list to a needed list;
  - resolving all in-map data references to metafuture children and continuing the traversal down the graph; and
- after the traversal:
  - in response to determining that the root metafuture contains an answer, returning the answer to the query.

10. The electronic device of claim 9, further comprising fetching all needed elements in a single batch call, and repeating the graph traversals.

11. The electronic device of claim 9, further comprising creating a map of data references to data, an initially empty list of data references to retrieve data elements, and phrasing data queries as a single question of arbitrary complexity.

12. The electronic device of claim 9, wherein a metafuture comprises attributes including:

a number of metafuture children;

a work list comprising a given number of tuples of lists of data references and functions that expect a list of data elements and return a metafuture, the lists of data references identifying data elements to be retrieved in order to run a matching function to generate a child metafuture, where the metafuture is constructed with an empty work list and a populated answer;

a graphing function that returns an answer of a desired type from a list of elements of the desired type; and a potential answer of the desired type.

13. A method of intelligently optimizing the lookup of graphed data contained within a data store, comprising the steps of:

defining, via a computer processor, an initial metafuture including a plurality of attributes starting with initial data references to determine a starting list of data reference dependencies with respect to metafuture construction functions;

in response to a query, initiating a recursive graph traversal of nodes in a graph starting with the initial metafuture as a root node; and at each step of the graph traversal:
- in response to determining that the metafuture contains an answer, traversing the graph laterally, or vertically if there are no further siblings;
- running a graphing function with answers of the children Metafutures, and continuing the traversal laterally, or vertically if there are no further siblings;
- in response to determining that the metafuture is unvisited in the traversal:
  - adding all not in-map data references in the work list to a needed list;
  - resolving all in-map data references to metafuture children and continuing the traversal down the graph; and
- after the traversal:
  - in response to determining that the root metafuture contains an answer, returning the answer to the query.

* * * * *